June 8, 1971 J. C. KOCI 3,583,079
SIMULATED AUTOMOBILE DRIVING APPARATUS
Filed Oct. 8, 1969 2 Sheets-Sheet 1
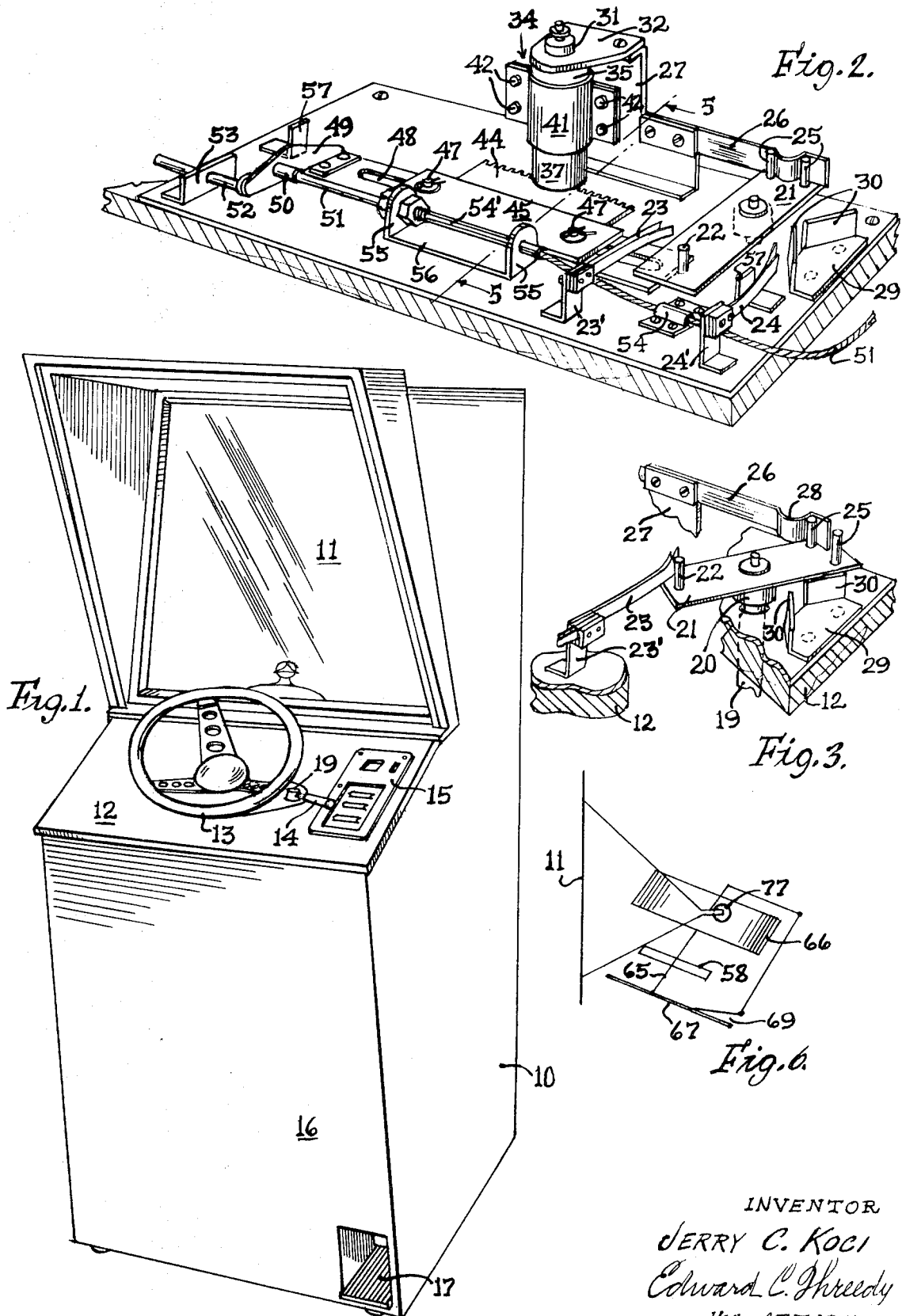
INVENTOR
JERRY C. KOCI
Edward C. Threedy
HIS ATTORNEY.

June 8, 1971   J. C. KOCI   3,583,079
SIMULATED AUTOMOBILE DRIVING APPARATUS
Filed Oct. 8, 1969   2 Sheets-Sheet 2
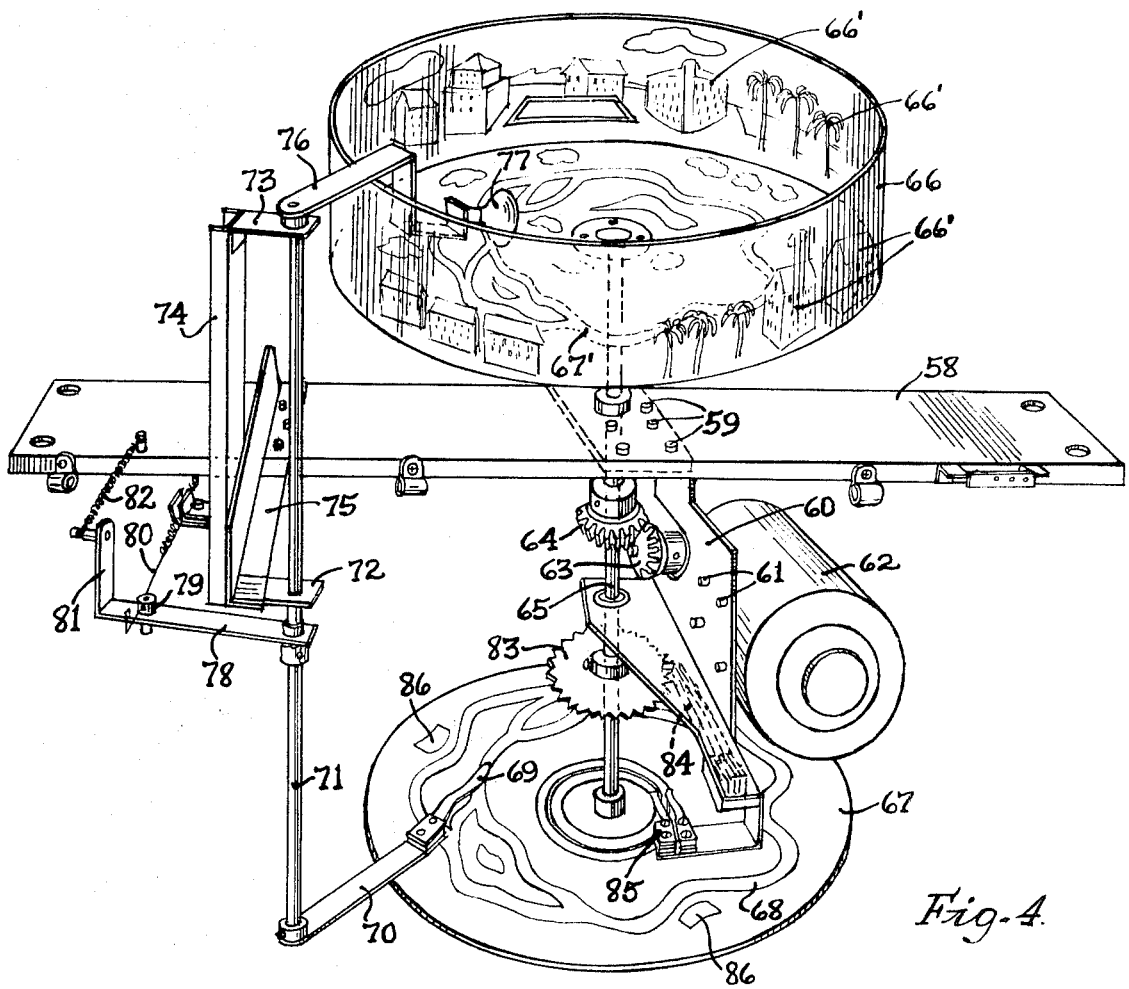
Fig.4.
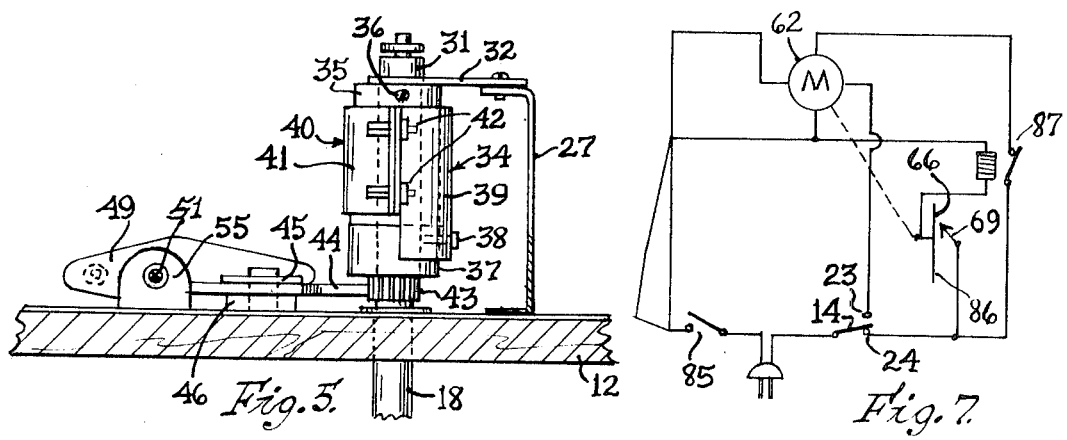
Fig.5.
Fig.7.
INVENTOR.
JERRY C. KOCI
Edward C. Threxin
HIS ATTORNEY.

United States Patent Office 3,583,079
Patented June 8, 1971

3,583,079
SIMULATED AUTOMOBILE DRIVING APPARATUS
Jerry C. Koci, Barrington, Ill., assignor to Chicago, Dynamic Industries, Inc., Chicago, Ill.
Filed Oct. 8, 1969, Ser. No. 864,750
Int. Cl. G09b 9/04
U.S. Cl. 35—11
8 Claims

ABSTRACT OF THE DISCLOSURE

An apparatus for simulating the progress of an automobile over a visually changing animated panoramic course projected upon a screen from a revolving transparent drum, with the apparatus including directional and speed controls, such as a steering wheel, gear control, and accelerator pedal, for testing reaction and skills as well as providing entertainment.

SUMMARY OF THE INVENTION

An apparatus including a simulated windshield-type screen upon which is projected a changing panoramic driving course that is readily visible to an operator who has under his control a steering wheel, a gear lever for changing the direction of his simulated movement over the visual course, and an accelerator pedal for regulating the speed of simulated movement over the course.

A rotating transparent drum is motor-driven about a vertical shaft within the cabinet housing the apparatus rearwardly of the windshield-type screen. A control disc having a printed electrical conductor path on one face thereof is connected to the shaft and simultaneously rotated with the transparent drum. The speed of rotation of the drum and control disc is regulated by the operator through the accelerator pedal.

A light source is positioned within the transparent drum and projects upon the windshield-type screen the transparencies carried thereby. The light source is carried by a movable shaft which is controlled by manipulation of the steering wheel. Also connected to the shaft and movable simultaneously with the light source is a contact finger adapted to be moved over the printed electrical conductive paths on the rotatable disc. With the light source movable relative to the drum and illuminating a portion thereof so as to project the transparencies thereon upon the windshield-type screen, the operator is presented with a simulated constantly changing panoramic view of a roadway background and obstacles, such as road blocks, stalled cars, curves, and intersections.

As the light source projects a changing perspective of the roadway, the contact finger is simultaneously moved over the printed circuit disc and will maintain electrical power source to the apparatus as long as the operator maintains his simulated position upon the roadway and does not have his progress interrupted or intercepted by the obstacles heretofore noted.

GENERAL DESCRIPTION

The objects of this invention will be achieved through the preferred embodiment shown in the accompanying drawings, in which:

FIG. 1 is a perspective view of the apparatus;

FIG. 2 is a perspective view of the mechanical components relating to the steering and driving mechanisms embodied in the apparatus;

FIG. 3 is a fragmentary perspective view of one portion of the directional control mechanism for the apparatus;

FIG. 4 is a perspective view of the mechanism for projecting the simulated panoramic roadway, and the electircal control device for the apparatus;

FIG. 5 is a fragmentary side sectional view taken on line 5—5 of FIG. 2;

FIG. 6 is a schematic diagram showing the relationship of parts and projection line upon the windshield-type screen of the apparatus;

FIG. 7 is a schematic diagram of the electrical circuit of the apparatus.

As viewed in FIG. 1, the apparatus is intended to be housed in a cabinet 10 which includes a hooded windshield-type translucent screen 11. A front panel 12 carries a steering wheel 13, a gear lever 14, directional indicators 15, and at the bottom of the front wall 16 a recessed accelerator pedal 17.

Mounted on the underside of the front panel 12, as shown in FIG. 2, are the mechanical components associated with the steering post 18 (see FIG. 5) and the gear lever rod 19 (see FIG. 3). The gear lever rod 19, as shown, extends through the panel 12 and by a bushing 20 is connected to a pivotal plate 21. One end of the plate 21 carries a pin 22 which projects into contact with either of the leaf switch structures 23 or 24 mounted on the panel 12 by suitable L-shaped brackets 23' and 24' respectively. The pin 22 carried by the plate 21 may be positioned between the switch structures 23 and 24 as shown in FIG. 2, wherein neither of these switches is closed and the electrical mechanism for simulating movement is in a neutral or non-operative condition. When the plate 21 is pivoted into the position shown in FIG. 3, with the pin 22 in contact with and closing the switch structure 23, the simulated driving action of the apparatus will be in a forward movement. Pivotal movement of the plate 21 through manipulation of the gear lever 14 in an opposite direction or such that the pin 22 is in contact with the switch structure 24, will simulate a backward or reverse movement of the apparatus.

To position the plate 21 in any of its three positions (neutral, forward, or reverse), the opposite end of the plate 21 carries two spaced aligned pins 25. These pins 25 cooperate with a yieldable spring finger 26 which extends longitudinally from a mounting bracket 27 into the path of movement of the pins 25, as seen in FIGS. 2 and 3.

The spring finger 26 provides a curved indentation 28 that will sit between pins 25 (see FIG. 2) or to either side of either pin (see FIG. 3) so as to yieldably retain the plate 21 in any of its pivoted positions. To limit pivotal movement of the plate 21, there is provided a bracket 29 that has two angular upright arms 30 disposed in the path of movement of one edge of the plate 21 as it is pivoted in either direction by actuation of the gear lever 14.

The steering wheel 13 provides a steering post 18 (FIG. 5) that extends through the front panel 12 and has its free end 31 projected through a horizontal arm 32 of the mounting bracket 27.

Journalled on the post 18 between the arm 32 and the panel 12 is a slip connector 34. This slip connector 34 comprises a bearing 35 which is secured to the post 18 by a set screw 36. A second bearing 37 is freely journalled on the post 18 beneath the bearing 35 and by a set screw 38 is connected to one-half 39 of a split sleeve 40. The two halves 39 and 41 of the split sleeve 40 provide lateral flanges which are connected together by screws 42.

The bearing 37 provides a pinion gear 43 that meshes with a toothed edge of a rack bar 44. The rack bar 44 is adapted to be slidably carried between two retaining plates 45 and 46 which by pins 47 are fixed to the panel 12. The pins 47 are adapted to extend through an elongated slot 48 formed in the rack bar 44 so as to permit the rack bar 44 to be moved longitudinally between the retaining plates 45 and 46 when the pinion gear 43 is rotated by movement of the steering post 18 in the slip connector 34. One end of the rack bar 44 carries a laterally extending flange 49 which in turn is connected as at 50 to one end of a Bowden wire 51. The flange 49 also carries a guide finger 52 that extends through an opening in a fixed guide plate 53 mounted on the panel 12. The wire 51 extends through a guide 54 and a guide tube 54' mounted between upright arms 55 of a bracket 56 mounted on the panel 12, as seen in FIG. 2.

To limit the movement of the rack bar 44 there is provided adjacent to and spaced from either end thereof, stop lugs 57. In the event that the steering wheel 13 is turned so as to move the rack bar 44 against one of the stop lugs 57 and then continued to be turned, the post 18 and its bearing 35 in the slip connector 34 will be permitted to continue to turn without effecting rotation of the pinion gear 43. This prevents damage to or breakage of the steering mechanism.

Positioned upon a shelf 58 within the cabinet 10 behind the windshield-type screen 11 in the manner schematically shown in FIG. 6, is the means for projecting the changing panoramic roadway upon the windshield screen and the manually directed electrical circuit control means for the entire apparatus.

Connected as at 59 to the underside of the shelf 58 and depending therefrom is a brace 60 that has connected thereto by means of screws 61, an electric motor 62. The motor 62 through suitable linkage (not shown) rotates in either direction a bevel gear 63 which in turn meshes with and rotates a second bevel gear 64 fixedly connected to an elongated shaft 65.

The elongated shaft 65 extends vertically of and is freely journalled through the shelf 58 and has fixedly connected thereto at its upper end a transparent drum 66. The bottom and peripheral walls of the drum 66 have printed thereon a series of transparencies 66' which, when illuminated, project upon the translucent windshield-type screen 11 in the line of sight of an operator of the apparatus. One of the transparencies comprises a tortuous path 67' that represents a winding roadway over which the simulated automobile is to be moved.

Fixedly connected to the lower end of the shaft 65 and rotatable therewith is a disc 67. On one face of the disc 67 there is printed an electrical conductive path 68 that is identical to the tortuous path 67' printed on the drum 66. A switch finger 69 is carried at the extremity of an arm 70 which in turn is fixed to one end of an elongated rod 71, and which finger is adapted to be movable over the disc 67. The rod 71 extends in a vertical spaced parallel relation with respect to the shaft 65 and is rotatably journalled through spaced flanges 72 and 73 provided by a vertical support 74, which in turn is carried by the shelf 58 by an L-shaped bracket 75, such as shown in FIG. 4. The upper end of the rod 71 provides a connecting member 76 that supports within the drum 66 a light 77.

Fixedly connected to the rod 71 is one end of a control arm 78 which has connected thereto at 79, the end 80 of the Bowden wire 51. The control arm 78 provides a flange 81 that by a spring 82 is connected to the shelf 58 and normally held in one position with respect thereto.

Mounted on the shaft 65 is a star wheel 83 that as it is rotated with the shaft 65, periodically closes a switch 84 which through suitable circuitry affects a timing device that is synchronized with the speed of the motor 62, which in turn is controlled through the accelerator pedal 17. This circuitry and its purpose, while adding to the skill and entertainment of the device, constitutes no part of the present invention.

The apparatus hereinbefore described may be electrical and coin-operated and in either condition the operation thereof will normally be commenced by effectively energizing the apparatus in any desired manner such as by closing a master control switch 85 (see FIG. 7).

Upon initial energization, the light 77 will be illuminated and a roadway scene will be projected upon the screen 11. By the initial energization, the motor 62 will not operate, as such initial energization will be of such a low magnitude that it will be insufficient to operate the motor 62 to rotate the drum 66 and control disc 67. Upon depression of the accelerator pedal 17 and the shifting of the gear lever 14 into its operative or forward position, which closes the switch 24, a sufficient amount of electrical energy will be applied to the motor 62 to commence operation of the apparatus. Through the actuation of the accelerator pedal 17, the speed of rotation of the drum 66 can be regulated by the operator. The rotation of the drum 66 will effect a moving panoramic roadway being projected upon the screen 11. As the roadway transparency on the drum 66 has a random or tortuous path, it will appear to move from side to side over the screen 11 as it is being projected.

To simulate a steering of the vehicle or following of the changing projected roadway, the operator will manipulate the steering wheel 13. The steering wheel 13 in turn will move the light 77 within the drum 66 and change the perspective of the transparency projected upon the screen 11 so as to visually effect a steering of the vehicle over the moving roadway.

If the operator is skillful in the handling of the steering wheel, he will also maintain the switch finger 69 upon the printed circuit path 68 carried by the control disc 67 and maintain the energization of the motor 62 for continuing operation of the device.

To test the skill of the operator there appears on the printed circuit disc 67 isolated contact pads 86 which may appear correspondingly on the projected roadway scene as automobiles or road blocks or such type of obstacles which would demand the driver to steer his simulated automobile around in order to prevent colliding with the same. If the operator in the manipulation of the steering wheel 11 does not effect movement of the switch finger 69 away from the contact pads 86, the motor 62 will be deenergized.

The above condition is brought about by the schematic circuitry shown in FIG. 7. The motor 62 which is a standard reversible type will be energized when the starting switch 85 is closed and the gear shift lever 14 is moved so that it closes switch 24 with the circuit line passing through a normally closed relay switch 87 as illustrated.

In the event that finger 69 contacts the electric contact pad 86 carried by the rotating control disc 67, the relay will be energized, opening the relay switch 87 to deenergize the motor 62. If the operator then moves the gear shift lever 14 so as to close the switch 23, the circuit to the relay is opened and relay switch 87 will again be closed. However, the motor 62 will be energized in a reversed direction to reverse the rotation of the disc 67 moving the pad 86 from beneath the contact finger 69 again placing the apparatus in condition to operate normally when the operator again shifts the gear level 14 so as to open switch 23 and again close switch 24.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A simulated automobile driving apparatus including a cabinet presenting a translucent windshield-type screen upon which is projected in the line of sight of an operator a moving panoramic tortuous roadway, and a steering wheel related to the screen and under the control of the operator for maintaining the simulated automobile upon the moving roadway, wherein the improvement comprises:
  (a) a mounting shelf within the cabinet behind and in spaced relation to the translucent screen,
  (b) a rotatable transparent member bearing roadway pictorial transparencies mounted on the shelf behind and in spaced relation to the screen,
  (c) a light source within said transparent member for projecting the roadway transparencies upon the screen and in the line of sight of the operator,
  (d) an electric motor connected to and rotating the transparent member between said light source and the screen for effecting projection upon the screen of a moving tortuous roadway to be traveled by the simulated automobile,
  (e) means connecting the steering wheel to said light source for moving the same over the roadway transparencies as said transparent member is rotated to change the perspective of the projected transparencies upon the screen to simulate a following movement of the automobile over such moving tortuous roadway, and
  (f) motor-energizing mean having one part simultaneously movable with said light source and another part rotatable with said rotatable transparent member for maintaining the energization of said electric motor to continue rotating said transparent member when said light source is moved within said member by the operator over the roadway transparencies projected upon the screen in the line of sight of the operator to simulate a following movement of the automobile over the changing panoramic tortuous roadway.

2. A simulated automobile driving apparatus as defined by claim 1 wherein said rotatable transparent member comprises a hollow drum, the bottom and peripheral walls of which are transparent and provide panoramic transparencies adapted to be continuously projected upon the translucent screen as said transparent member is rotated within the cabinet.

3. A simulated automobile driving apparatus as defined by claim 1 wherein said means connecting the steering wheel to said light source and to said one part of said energizing means, includes a rotatable bushing frictionally connected to the post of the steering wheel, a pinion gear on said bushing adapted to mesh with a rack bar to reciprocally move the same in response to rotatable movement of the steering wheel, and a movable connector between said rack bar and a rotatable rod supporting said light source and said one part of said energizing means for moving the same within said rotatable transparent member and over said other part of said energizing means in response to movement of said steering wheel.

4. A simulated automobile driving apparatus as defined by claim 3 wherein said rotatable transparent member comprises a hollow drum, the bottom and peripheral walls of which are transparent and provide panoramic transparencies adapted to be continuously projected upon the translucent screen as said transparent member is rotated within the cabinet.

5. A simulated automobile driving apparatus as defined by claim 1 wherein said one part of said motor-energizing means constitutes a switch finger connected to and movable with said light source over said other part of said motor-energizing means which constitutes a disc connected to and rotatable with said transparent member, with said disc providing a tortuous electrical conductive path corresponding to the roadway transparency provided by said transparent member, with said switch finger movable in contact therewith when said light source is moved over the rotating roadway transparencies on said transparent member, with said switch finger and said electrical conductive path maintaining energization of said electric motor.

6. A simulated automobile driving apparatus as defined by claim 5 wherein said means connecting the steering wheel to said light source and to said switch finger, includes a rotatable bushing frictionally connected to the post of the steering wheel, a pinion gear on said bushing adapted to mesh with a rack bar to reciprocally move the same in response to rotatable movement of the steering wheel, and a movable connector between said rack bar and a rotatable rod supporting said light source and said switch finger for moving the same within said rotatable transparent member and over said electrical conductive path in response to movement of the steering wheel.

7. A simulated automobile driving apparatus as defined by claim 2 wherein said one part of said motor-energizing means constitutes a switch finger connected to and movable with said light source over said other part of said motor-energizing means which constitutes a disc connected to and rotatable with said transparent drum, with said disc providing a tortuous electical conductive path corresponding to the roadway transparency provided by said transparent drum, with said switch finger movable in contact therewith when said light source is moved over the rotating roadway transparencies on said transparent drum with said switch finger and said electrical conductive path maintaining energization of said electric motor.

8. A simulated automobile driving apparatus as defined by claim 7 wherein said means connecting the steering wheel to said light source and to said switch finger, includes a rotatable bushing frictionally connected to the post of the steering wheel, a pinion gear on said bushing adapted to mesh with a rack bar to reciprocally move the same in response to rotatable movement of the steering wheel, and a movable connector between said rack bar and a rotatable rod supporting said light source and said switch finger for moving the same within said rotatable transparent drum and over said electrical conductive path in response to movement of said steering wheel.

References Cited
UNITED STATES PATENTS

| | | | |
|---|---|---|---|
| 2,148,828 | 2/1939 | Myers | 35—11X |
| 2,943,855 | 7/1960 | Javna et al. | 35—11X |
| 3,060,598 | 10/1962 | Gilbert et al. | 35—12(L) |
| 3,171,215 | 3/1965 | Glass et al. | 35—11 |

WILLIAM H. GRIEB, Primary Examiner